(12) United States Patent
Addock et al.

(10) Patent No.: US 7,908,201 B2
(45) Date of Patent: Mar. 15, 2011

(54) CROSS AND POST ORDER

(75) Inventors: Paul D. Addock, Burr Ridge, IL (US); Michael A. Cormack, Evanston, IL (US); Thomas F. Haller, Longwood, FL (US); Robert A. Hill, LaGrange, IL (US)

(73) Assignee: Archipelago Holdings, Inc., Chicago, IL (US)

( * ) Notice: Subject to any disclaimer, the term of this patent is extended or adjusted under 35 U.S.C. 154(b) by 752 days.

(21) Appl. No.: 11/345,420

(22) Filed: Jan. 31, 2006

(65) Prior Publication Data

US 2006/0253374 A1    Nov. 9, 2006

Related U.S. Application Data

(60) Provisional application No. 60/678,083, filed on May 5, 2005.

(51) Int. Cl.
*G06Q 40/00* (2006.01)

(52) U.S. Cl. .............................. 705/37; 705/35; 705/36 R (58) Field of Classification Search .................... 705/35, 705/36 R, 37
See application file for complete search history.

(56) References Cited

U.S. PATENT DOCUMENTS

| | | | |
|---|---|---|---|
| 5,101,353 A | 3/1992 | Lupien et al. | |
| 5,560,580 A | 10/1996 | Almoslino | |
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A | 1/2000 | Lupien et al. | |
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |

(Continued)

FOREIGN PATENT DOCUMENTS

AU    2006/24483    11/2006

(Continued)

OTHER PUBLICATIONS

Phlx Allows Floor Broker Crossing Wall Street Letter. New York: Feb. 24, 2003. p. 1.*

(Continued)

*Primary Examiner* — Lalita M Hamilton
(74) *Attorney, Agent, or Firm* — Milbank, Tweed, Hadley & McCloy LLP (57) ABSTRACT

A cross and post order and related market center and process are disclosed which automatically convert any unfilled balance of a cross order that was broken up due to interaction with the posting market center's order book to a limit order at the same price. The process also automatically associates the transactions that are used to fill the generated limit order with the cross and post order that was originally sent to the posting market center for execution.

17 Claims, 4 Drawing Sheets

U.S. PATENT DOCUMENTS

| | | |
|---|---|---|
| 6,963,856 B2 | 11/2005 | Lutnick et al. |
| 6,983,260 B2 | 1/2006 | Hummelgren |
| 7,162,448 B2 | 1/2007 | Madoff et al. |
| 7,184,982 B1 | 2/2007 | Howorka et al. |
| 7,197,483 B2 | 3/2007 | Brady et al. |
| 7,209,896 B1 | 4/2007 | Serkin et al. |
| 7,225,153 B2 | 5/2007 | Lange |
| 7,242,669 B2 | 7/2007 | Bundy et al. |
| 7,246,090 B1 | 7/2007 | Thomas |
| 7,246,093 B1 | 7/2007 | Katz |
| 7,249,086 B2 | 7/2007 | Bloom et al. |
| 7,356,498 B2 | 4/2008 | Kaminsky et al. |
| 7,383,220 B1 | 6/2008 | Keith |
| 7,401,046 B2 | 7/2008 | Hollerman et al. |
| 7,467,110 B2 | 12/2008 | Muller et al. |
| 7,685,057 B2 | 3/2010 | Chiulli et al. |
| 2001/0037284 A1 | 11/2001 | Finkelstein et al. |
| 2002/0010672 A1 | 1/2002 | Waelbroeck et al. |
| 2002/0010673 A1 | 1/2002 | Muller et al. |
| 2002/0019795 A1 | 2/2002 | Madoff et al. |
| 2002/0019799 A1 | 2/2002 | Ginsberg et al. |
| 2002/0042765 A1 | 4/2002 | Dawson et al. |
| 2002/0062273 A1 | 5/2002 | Perkel et al. |
| 2002/0082979 A1 | 6/2002 | Sands et al. |
| 2002/0091617 A1 | 7/2002 | Keith |
| 2002/0091621 A1 | 7/2002 | Conklin et al. |
| 2002/0120511 A1 | 8/2002 | Hanes |
| 2002/0128951 A1 | 9/2002 | Kiron et al. |
| 2002/0128955 A1 | 9/2002 | Brady et al. |
| 2002/0128958 A1 | 9/2002 | Slone |
| 2002/0143676 A1 | 10/2002 | Kiron et al. |
| 2002/0147670 A1 | 10/2002 | Lange |
| 2002/0161687 A1 | 10/2002 | Serkin et al. |
| 2002/0169703 A1 | 11/2002 | Lutkin et al. |
| 2002/0184135 A1 | 12/2002 | Zakaria |
| 2002/0184136 A1 | 12/2002 | Cleary et al. |
| 2002/0198815 A1 | 12/2002 | Greifeld et al. |
| 2002/0198816 A1 | 12/2002 | Gilbert et al. |
| 2003/0004851 A2 | 1/2003 | Kiron et al. |
| 2003/0004858 A1 | 1/2003 | Schmitz et al. |
| 2003/0009400 A2 | 1/2003 | Kiron et al. |
| 2003/0009412 A1 | 1/2003 | Furbush et al. |
| 2003/0009413 A1 | 1/2003 | Furbush et al. |
| 2003/0009414 A1 | 1/2003 | Furbush et al. |
| 2003/0014351 A1 | 1/2003 | Neff et al. |
| 2003/0023536 A1 | 1/2003 | Hollerman et al. |
| 2003/0040955 A1 | 2/2003 | Anaya et al. |
| 2003/0041006 A1 | 2/2003 | Bunda |
| 2003/0083974 A1 | 5/2003 | Bunda |
| 2003/0093343 A1 | 5/2003 | Huttenlocher et al. |
| 2003/0097328 A1 | 5/2003 | Lundberg et al. |
| 2003/0115131 A1 | 6/2003 | Heaton et al. |
| 2003/0130920 A1 | 7/2003 | Freund |
| 2003/0130925 A1 | 7/2003 | Malitzis |
| 2003/0130926 A1 | 7/2003 | Moore |
| 2003/0135443 A1 | 7/2003 | Moore et al. |
| 2003/0139998 A1 | 7/2003 | Gilbert et al. |
| 2003/0172024 A1 | 9/2003 | Kokis et al. |
| 2003/0177082 A1 | 9/2003 | Buckwalter |
| 2003/0191703 A1 | 10/2003 | Chen et al. |
| 2003/0216932 A1 | 11/2003 | Foley |
| 2003/0229557 A1 | 12/2003 | Richmann et al. |
| 2003/0233307 A1 | 12/2003 | Salvadori et al. |
| 2004/0030630 A1 | 2/2004 | Tilfors et al. |
| 2004/0044610 A1 | 3/2004 | Fraser et al. |
| 2004/0059666 A1 | 3/2004 | Waelbroeck et al. |
| 2004/0088242 A1 | 5/2004 | Ascher et al. |
| 2004/0143538 A1 | 7/2004 | Korhammer et al. |
| 2004/0143542 A1 | 7/2004 | Magill et al. |
| 2004/0177024 A1 | 9/2004 | Bok et al. |
| 2004/0177026 A1 | 9/2004 | Balabon |
| 2004/0210508 A1 | 10/2004 | Bohnenberger |
| 2004/0210511 A1 | 10/2004 | Waelbroeck et al. |
| 2004/0215538 A1 | 10/2004 | Smith et al. |
| 2004/0225592 A1 | 11/2004 | Churquina |
| 2004/0236662 A1 | 11/2004 | Korhammer et al. |
| 2004/0236669 A1 | 11/2004 | Horst et al. |
| 2004/0243502 A1 | 12/2004 | Slowik et al. |
| 2004/0254804 A1 | 12/2004 | Peterffy et al. |
| 2004/0254877 A1 | 12/2004 | Buckwalter et al. |
| 2004/0267655 A1 | 12/2004 | Davidowitz et al. |
| 2005/0010481 A1 | 1/2005 | Lutnick et al. |
| 2005/0075963 A1 | 4/2005 | Balabon |
| 2005/0096999 A1 | 5/2005 | Newell et al. |
| 2005/0119964 A1 | 6/2005 | Brady et al. |
| 2005/0125316 A1 | 6/2005 | Levering et al. |
| 2005/0137962 A1 | 6/2005 | Penney et al. |
| 2005/0160024 A1 | 7/2005 | Soderborg et al. |
| 2005/0171887 A1 | 8/2005 | Daley et al. |
| 2005/0171888 A1 | 8/2005 | Daley et al. |
| 2005/0171889 A1 | 8/2005 | Daley et al. |
| 2005/0171890 A1 | 8/2005 | Daley et al. |
| 2005/0171891 A1 | 8/2005 | Daley et al. |
| 2005/0171895 A1 | 8/2005 | Howorka et al. |
| 2005/0197916 A1 | 9/2005 | Newell et al. |
| 2005/0222936 A1 | 10/2005 | Panariti et al. |
| 2005/0228739 A1 | 10/2005 | Leibowitz |
| 2005/0240510 A1 | 10/2005 | Schweickert et al. |
| 2005/0273407 A1 | 12/2005 | Black et al. |
| 2005/0273408 A1 | 12/2005 | Bandman et al. |
| 2005/0273419 A1 | 12/2005 | Ogg et al. |
| 2005/0283415 A1 | 12/2005 | Studnitzer et al. |
| 2005/0283421 A1 | 12/2005 | Hatheway et al. |
| 2005/0283426 A1 | 12/2005 | Krishnasami et al. |
| 2005/0283427 A1 | 12/2005 | Owens et al. |
| 2006/0020536 A1 | 1/2006 | Renton et al. |
| 2006/0031157 A1 | 2/2006 | Gianakouros et al. |
| 2006/0089898 A1 | 4/2006 | Durkin et al. |
| 2006/0089899 A1 | 4/2006 | Durkin et al. |
| 2006/0136318 A1 | 6/2006 | Rafieyan et al. |
| 2006/0136326 A1 | 6/2006 | Heckman et al. |
| 2006/0149659 A1 | 7/2006 | Carone et al. |
| 2006/0161494 A1 | 7/2006 | Littlewood |
| 2006/0184444 A1 | 8/2006 | McConaughy et al. |
| 2006/0206404 A1 | 9/2006 | Hatheway et al. |
| 2006/0206407 A1 | 9/2006 | Troxel et al. |
| 2006/0235786 A1 | 10/2006 | DiSalvo |
| 2006/0253374 A1 | 11/2006 | Addock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris et al. |
| 2010/0030704 A1 | 2/2010 | Griffin et al. |

FOREIGN PATENT DOCUMENTS

| | | |
|---|---|---|
| AU | 2006/244479 | 11/2006 |
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 6/2003 |
| JP | 2008/510109 | 4/2006 |
| JP | 2008/510238 | 4/2006 |
| JP | 2008/510110 | 4/2008 |
| JP | 2008/510226 | 4/2008 |
| SG | 2007/166754 | 11/2007 |
| SG | 2007/166770 | 11/2007 |
| SG | 2007/166788 | 11/2007 |
| SG | 2007/166796 | 11/2007 |
| SG | 2007/166804 | 11/2007 |
| SG | 2007/166812 | 11/2007 |
| SG | 2007/166762 | 12/2007 |
| WO | WO 01/07039 | 1/2001 |
| WO | WO 01/09008 | 2/2001 |
| WO | WO 01/22339 | 2/2001 |
| WO | WO 01/22322 | 3/2001 |
| WO | WO 01/52166 | 7/2001 |
| WO | WO 01/75733 | 10/2001 |
| WO | WO 01/90925 | 11/2001 |

| | | |
|---|---|---|
| WO | WO 2004/008296 | 1/2004 |
| WO | WO 2005/010790 | 2/2005 |
| WO | WO 2005/036354 | 4/2005 |
| WO | PCTUS2006016683 | 2/2006 |
| WO | PCTUS2006016684 | 2/2006 |
| WO | PCTUS2006016685 | 2/2006 |
| WO | PCTUS2006016701 | 2/2006 |
| WO | PCTUS2006017249 | 2/2006 |
| WO | PCTUS2006017253 | 2/2006 |
| WO | PCTUS2006017296 | 2/2006 |
| WO | PCTUS2006036461 | 4/2006 |
| WO | PCTUS2006036878 | 4/2006 |
| WO | PCTUS2007016571 | 2/2007 |
| WO | PCTUS2007016572 | 2/2007 |
| WO | PCTUS2007016682 | 2/2007 |
| WO | PCTUS2007016718 | 2/2007 |
| WO | PCTUS2007016856 | 2/2007 |
| WO | PCTUS2007016857 | 2/2007 |
| WO | PCTUS2007024921 | 3/2007 |

OTHER PUBLICATIONS

Rising tide lifts all boats in institutional equities Anonymous. The Investment Dealers' Digest : IDD. New York: Mar. 28, 1994. vol. 60, Iss. 13; p. 16, 5 pgs.*
Headstrong buys assets of Elind software provider; NoticiasFinancieras. Miami: Nov. 1, 2004. p. 1.*
Australian Patent Office Written Opinion and Search Report, mailed Feb. 13, 2009.
U.S. Appl. No. 61/191,055, filed Oct. 28, 2008, Neuner et al.
U.S. Appl. No. 11/881,788, filed Jul. 27, 2007, Adcock et al.
U.S. Appl. No. 11/881,789, filed Jul. 27, 2007, Adcock et al.
U.S. Appl. No. 11/881,064, filed Jul. 25, 2007, Adcock et al.
U.S. Appl. No. 11/880,852, filed Jul. 24, 2007, Armstrong et al.
U.S. Appl. No. 11/880,840, filed Jul. 24, 2007, Adcock et al.
U.S. Appl. No. 11/880,686, filed Jul. 24, 2007, Haller et al.
U.S. Appl. No. 11/416,756, filed May 3, 2006, Adcock et al.
U.S. Appl. No. 11/416,913, filed May 3, 2006, Adcock et al.
U.S. Appl. No. 11/416,942, filed May 3, 2006, Adcock et al.
U.S. Appl. No. 11/416,710, filed May 3, 2006, Adcock et al.
U.S. Appl. No. 11/634,020, filed Dec. 4, 2006, Jimenez et al.
U.S. Appl. No. 60/721,165, filed Sep. 28, 2005, Drake et al.
U.S. Appl. No. 11/122,679, filed May 5, 2005, Adcoco et al.
U.S. Appl. No. 11/122,689, filed May 5, 2005, Adcoco et al.
U.S. Appl. No. 11/345,420, filed Jan. 31, 2006, Adcock et al.
U.S. Appl. No. 11/527,797, filed Sep. 27, 2006, Drake et al.
U.S. Appl. No. 11/525,363, filed Sep. 22, 2006, Cormack et al.
U.S. Appl. No. 11/122,498, filed May 5, 2005, Brill et al.
U.S. Appl. No. 11/345,421, filed Jan. 31, 2006, Adcock et al.
U.S. Appl. No. 11/416,943, filed May 3, 2006, Adcock et al.
International Search Report & Written Opinion, PCT/US07/16856, Nov. 10, 2008.
International Search Report, Mar. 20, 2008 for PCT/US2007/016718.
International Preliminary Report on Patentability, PCT/US2007/016572, Apr. 23, 2009.
International Preliminary Report on Patentability, PCT/US2007/024921, Jun. 18, 2009.
Mckinnion, Julie M., Toldeo Ohio-Based Dana Corp. Could Lose NYSE Listing in Takeover Battle, The Blade, Aug. 3, 2003.
Young, Lee, W., International Search Report May 18, 2007, 4 pages.
Young, Lee, W., International Search Report Sep. 12, 2007, 6 pages.
Young, Lee, W., International Search Report Aug. 9, 2007, 6 pages.
Young, Lee, W., International Search Report Aug. 29, 2007, 7 pages.
Young, Lee, W., International Search Report Sep. 5, 2007, 8 pages.
Young, Lee, W., International Search Report Sep. 7, 2007, 5 pages.
Young, Lee, W., International Search Report Sep. 29, 2007, 6 pages.
Australian Patent Office Written Opinion & Search Report, mailed Dec. 1, 2008.
Australian Patent Office Written Opinion & Search Report, mailed Jan. 9, 2009.
International Search Report, Jul. 2, 2008 for PCT/US2007/016572.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for U.S. Appl. No. 11/345,420.
International Search Report, Sep. 5, 2008 for PCT/US2007/016857.
International Search Report, Nov. 10, 2008 for PCT/US2007/016856.
International Search Report, Sep. 18, 2008 for PCT/US2007/016856.
Non-Final Rejection, Feb. 26, 2008.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
International Search Report, Jun. 17, 2008 for PCT/US2007/016682.
International Search Report, Jun. 17, 2008 for PCT/US2007/016571.
International Search Report, May 12, 2008 for PCT/US2007/024921.
Non-Final Rejection, Feb. 12, 2008 for U.S. Appl. No. 11/122,498.
Response to Non-Final, Aug. 14, 2008 for U.S. Appl. No. 11/122,498.
Final Rejection, Sep. 19, 2008 for U.S. Appl. No. 11/122,498.
Response to Final, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final, Sep. 22, 2008 for U.S. Appl. No. 11/345,421.
Final Rejection, Jan. 26, 2009 for U.S. Appl. No. 11/345,421.
Response to Final, May 22, 2009 for U.S. Appl. No. 11/345,421.
Non-Final Rejection, Sep. 30, 2008 for U.S. Appl. No. 11/416,942.
Response to Non-Final, Jan. 12, 2009 for U.S. Appl. No. 11/416,942.
Final Rejection, Apr. 23, 2009 for U.S. Appl. No. 11/416,942.
Non-Final Rejection, Apr. 4, 2008 for U.S. Appl. No. 11/416,710.
Informal Response to Non-Final, Aug. 4, 2008 for U.S. Appl. No. 11/416,710.
Notice to Applicant re: Informal Response to Non-Final, Sep. 11, 2008 for U.S. Appl. No. 11/416,710.
Response to Non-Final, Sep. 19, 2008 for U.S. Appl. No. 11/416,710.
Non-Final Rejection, Dec. 30, 2008 for U.S. Appl. No. 11/416,710.
Response to Non-Final, Mar. 27, 2009 for U.S. Appl. No. 11/416,710.
Non-Final Rejection, Dec. 29, 2008 for U.S. Appl. No. 11/416,913.
Response to Non-Final, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final, Apr. 27, 2009 for U.S. Appl. No. 11/416,756.
Non-Final Rejection, Aug. 4, 2009 for U.S. Appl. No. 11/416,756.
Non-Final Rejection, Sep. 3, 2008 for U.S. Appl. No. 11/416,943.
Response to Non-Final, Dec. 5, 2008 for U.S. Appl. No. 11/416,943.
Final Rejection, Mar. 17, 2009 for U.S. Appl. No. 11/416,943.
Response to Final, Jun. 17, 2009 for U.S. Appl. No. 11/416,943.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final, Dec. 15, 2008 for U.S. Appl. No. 11/527,797.
Final Rejection, Mar. 30, 2009 for U.S. Appl. No. 11/527,797.
Response to Final, May 19, 2009 for U.S. Appl. No. 11/527,797.
Non-Final Rejection, Nov. 12, 2008 for U.S. Appl. No. 11/634,020.
Response to Non-Final, Feb. 17, 2009 for U.S. Appl. No. 11/634,020.
Non-Final Rejection, Jun. 24, 2009 for U.S. Appl. No. 11/634,020.
Response to Final, Sep. 30, 2009 for U.S. Appl. No. 11/416,942.
Examiner Interview Summary Record, Mar. 31, 2009 for U.S. Appl. No. 11/416,943.
Nonfinal Rejection, Sep. 30, 2009 for U.S. Appl. No. 11/416,943.
NASDAQ Launches Liquidity Tracker, HighBeam Research, Dec. 5, 2002.
Response to Nonfinal, Sep. 29, 2009 for U.S. Appl. No. 11/634,020.

Response to Final, Oct. 19, 2009 for U.S. Appl. No. 11/416,913.
International Search Report, Oct. 14, 2009 for SG2007166754.
International Search Report, Oct. 2, 2009 for SG2007166812.
Nonfinal Rejection, Aug. 17, 2009 for U.S. Appl. No. 11/416,710.
Response to Nonfinal, Nov. 2, 2009 for U.S. Appl. No. 11/416,710.
Response to Final, Oct. 7, 2009 for U.S. Appl. No. 11/416,942.
Examiner Interview Summary, Oct. 14, 2009 for U.S. Appl. No. 11/416,942.
Nonfinal Rejection, Oct. 7, 2009 for U.S. Appl. No. 11/345,421.
Response to Nonfinal, Nov. 6, 2009 for 416,756.
A Taxonomy of Automated Trade Execution Systems, Ian Domowitz, Journal of International Money and Finance, (1993), 12, pp. 607-631.
Dec. 14, 2009 Notice of Allowance for U.S. Appl. No. 11/122,689.
Nov. 23, 2009 Response to Nonfinal for U.S. Appl. No. 11/345,421.
Dec. 29, 2009 Notice of Allowance for U.S. Appl. No. 11/416,942.
Dec. 14, 2009 Response to Nonfinal for U.S. Appl. No. 11/416,943.
Nov. 16, 2009 Response to Nonfinal for U.S. Appl. No. 11/525,363.
Aug. 12, 2009 Nonfinal Rejection for U.S. Appl. No. 11/527,797.
Nov. 17, 2009 Response to Nonfinal for U.S. Appl. No. 11/527,797.
Dec. 28, 2009 Final Rejection for U.S. Appl. No. 11/634,020.
Nov. 6, 2009 Nonfinal Rejection for U.S. Appl. No. 11/880,686.
Roger D. Huang et al., Tick Size, Bid-Ask Spreads and Market Structure, Feb. 8, 2001, Forthcoming Journal of Financial and Quantitative Analysis p. 1-29.
Bart Frijns et al., Price discovery in tick time, Journal of Empirical Financial, vol. 16, Issue 5, Dec. 2009, p. 759-776.
Tseng, K.C., Supermontage as a New Trading System of NASDAQ, Investment Management and Financial Innovations, Mar. 2005.
Schnitzlein, Charles R., Call and Continuous Trading Mechanisms Under Asymmetric Information: An Experimental Investigation, The Journal of Finance, vol. 51, No. 2, p. 613-636.
Jan. 26, 2010 Notice of Allowance for U.S. Appl. No. 11/122,689.
Jan. 15, 2010 Notice of Allowance for U.S. Appl. No. 11/122,679.
Jan. 21, 2010 Examiner Interview for U.S. Appl. No. 11/122,498.
Jan. 21, 2010 Final Rejection for U.S. Appl. No. 11/122,498.
Jan. 26, 2010 Notice of Allowance for U.S. Appl. No. 11/416,942.
Jan. 22, 2010 Nonfinal Rejection for U.S. Appl. No. 11/416,913.
Jan. 26, 2010 Final Rejection for U.S. Appl. No. 11/527,797.
Mar. 1, 2010 Notice of Allowance for U.S. Appl. No. 11/122,689.
Jun. 16, 2010 Response to Final Rejection for U.S. Appl. No. 11/122,498.
Jul. 1, 2010 Notice of Allowance for U.S. Appl. No. 11/122,498.
Apr. 2, 2010 Notice of Allowance for U.S. Appl. No. 11/345,421.
Feb. 24, 2010 Notice of Allowance for U.S. Appl. No. 11/416,942.
Jun. 16, 2010 Notice of Allowance for U.S. Appl. No. 11/416,942.
Mar. 22, 2010 Notice of Allowance for U.S. Appl. No. 11/416,710.
Jun. 15, 2010 Notice of Allowance for U.S. Appl. No. 11/416,710.
Jun. 22, 2010 Response to Final Rejection for U.S. Appl. No. 11/416,913.
Apr. 27, 2010 Final Rejection for U.S. Appl. No. 11/416,756.
Mar. 23, 2010 Non-Final Rejection for U.S. Appl. No. 11/416,943.
Jun. 23, 2010 Response to Non-Final Rejection for U.S. Appl. No. 11/416,943.
Jul. 6, 2010 Proposed Examiner's Amendment for U.S. Appl. No. 11/525,363.
Mar. 16, 2010 Request for Reconsideration for U.S. Appl. No. 11/634,020.
Apr. 28, 2010 Non-Final Rejection for U.S. Appl. No. 11/634,020.
Jul. 28, 2010 Response to Non-Final Rejection for U.S. Appl. No. 11/634,020.
Jul. 6, 2010 Non-Final Rejection for U.S. Appl. No. 11/880,840.
May 3, 2010 Response to Non-Final Rejection for U.S. Appl. No. 11/880,686.
Jul. 21, 2010 Final Rejection for U.S. Appl. No. 11/880,686.
Jun. 30, 2010 Non-Final Rejection Jun. 30, 2010 for U.S. Appl. No. 11/881,064.
Dec. 1, 2009 Non-Final Rejection for U.S. Appl. No. 11/881,789.
Mar. 19, 2010 Response to Non-Final Rejection for U.S. Appl. No. 11/881,789.
Jun. 29, 2010 Non-Final Rejection for U.S. Appl. No. 11/881,788.
Aug. 3, 2010 Notice of Abandonment for 11/527,797.
Aug. 4, 2010 Notice of Allowance and Issue Fee Due for U.S. Appl. No. 11/345,421.

* cited by examiner

CROSS AND POST ORDER

CROSS-REFERENCE TO RELATED APPLICATIONS

This application claims priority from and claims the benefit of U.S. Provisional Application No. 60/678,083, filed May 5, 2005, entitled "Restricted Cross and Post Order", which is hereby incorporated by reference.

BACKGROUND

A cross order is an order type that has both a buy and a sell component. In a cross order, the buyer and seller have agreed to a price and a quantity to be traded. Although a cross order is a pre-negotiated trade, it must nevertheless execute on the public markets, in accordance with prevailing marketplace regulations. In a situation where the buyer's and the seller's shares execute in whole cleanly against one another, this is the ideal situation and is referred to as a "clean cross." However, when a cross order does not execute cleanly because it interacts with orders on the market center's order book, this is referred to as a "cross with interaction." In a "cross with interaction," the side of the cross order that does not interact with the marketplace is left partially unexecuted. In prior systems, the unmatched shares of a cross order are automatically canceled, and an order for the unmatched portion of the cross order needs to be generated and resubmitted.

Typically, the broker trying to execute a cross order with such prior systems is responsible for determining what portion of the cross order has not executed and is responsible for manually submitting a new order or orders for the unfilled balance. The broker is also responsible in such situations for tracking the unfilled balance of the cross order and associating the separate trades with it until the original cross order terms are fulfilled.

Accordingly, there is a need for a cross order where a limit-priced order is automatically generated and posted to the market center order book for any unfilled balance of a cross order when the cross order interacts with the market. There is also a need for the subsequent execution of such generated limit-priced orders to be automatically associated with the original cross order.

SUMMARY

According to an aspect of the present invention, a method for processing a cross order includes providing a posting market center having an order book. It further includes receiving a cross order and matching at least a portion of the cross order against the internal order book, resulting in a remainder of the cross order. It also includes matching the remainder of the cross order against itself, resulting in an unexecuted portion of the cross order. It further includes converting the unexecuted portion of the cross order into a limit-priced order and posting the limit-priced order generated from the conversion to the order book.

DESCRIPTION OF THE DRAWINGS

These and other features, aspects and advantages of the present invention will become better understood with regard to the following description, appended claims and accompanying drawings where:

DETAILED DESCRIPTION

Figure 1:
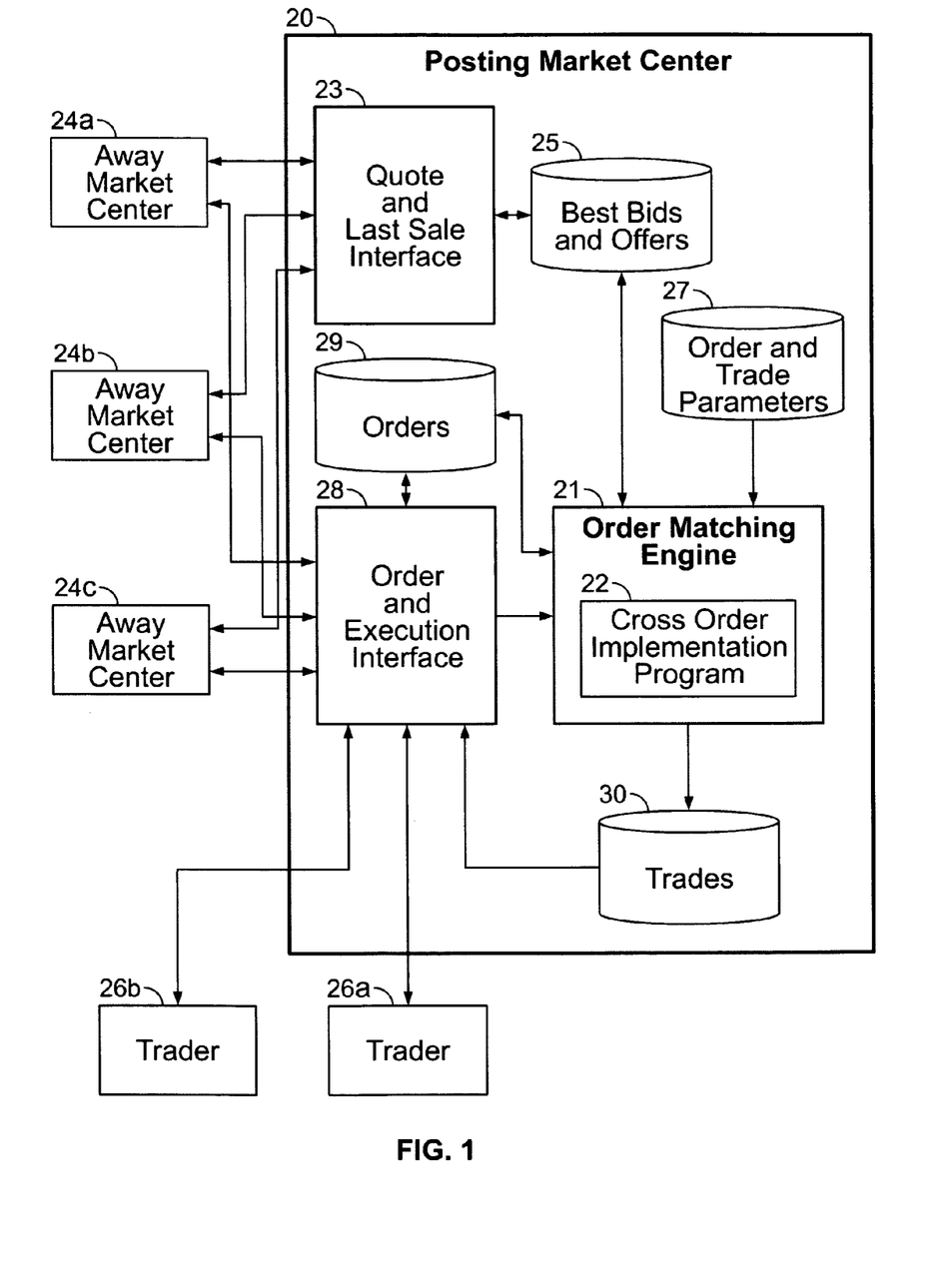
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., securities, futures contracts, options, bonds, etc.). The trading environment of this embodiment includes a posting market center 20 which interacts with a number of other market centers 24 (i.e. away market centers) and traders 26. It should be understood that the posting market center 20 referred to herein refers to a computing system having sufficient processing and memory capabilities and does not refer to a specific physical location. In fact, in certain embodiments, the computing system may be distributed, over several physical locations. It should also be understood that any number of traders 26 or away market centers 24 can interact with the posting market center 20. The posting market center 20 is the market center on which a specific trader 26 posts a specific order. The posting market center 20 includes an order matching engine 21, which validates, matches and processes all orders on the market center 20. In this embodiment, the order matching engine 21 includes a cross order implementation program 22, which executes cross orders and automatically posts any unmatched portion to the order book of the posting market center 20. The cross order implementation program 22 may also be utilized as stand alone code separate and apart from the order matching engine 21. In this embodiment, the code for the order matching engine 21 and for the cross order implementation program 22 are stored in the posting market center's memory.

The posting market center 20 may also include a quote and last sale interface 23 that interacts with the away market centers 24 to capture quote and last sale information. This information is stored to a best bids and offers data structure 25. This data structure 25 is where the market best bid and offer information is stored. The posting market center 20 may also include an order and trade parameters data structure 27. The order and trade parameters data structure 27 stores predefined trading parameters and rules that are used by the order matching engine 21 in matching orders and executing trades. The posting market center 20 may also include an order and execution interface 28 which interacts with the traders 26, the away market centers 24 and the order matching engine 21 in the order execution process. The posting market center 20 may also include an order information data structure 29 where order information is stored and a trade information data structure 30 where completed trade information is stored.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Incoming Market Center-Restricted Cross and Post Order

Figure 2:
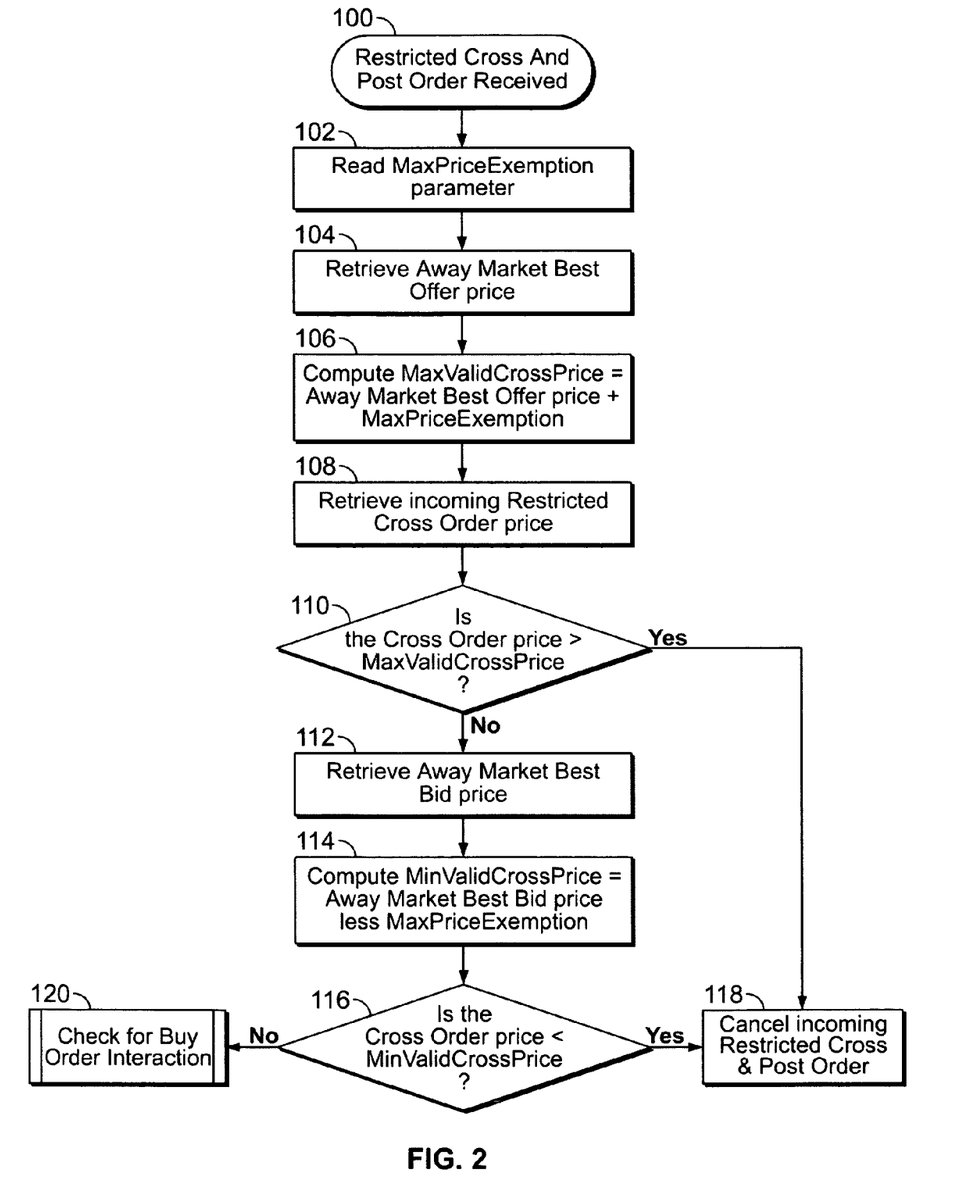
FIG. 2 is a flow diagram illustrating a process implemented by an embodiment of the present invention for incoming market center-restricted cross and post orders.
Figure 3:
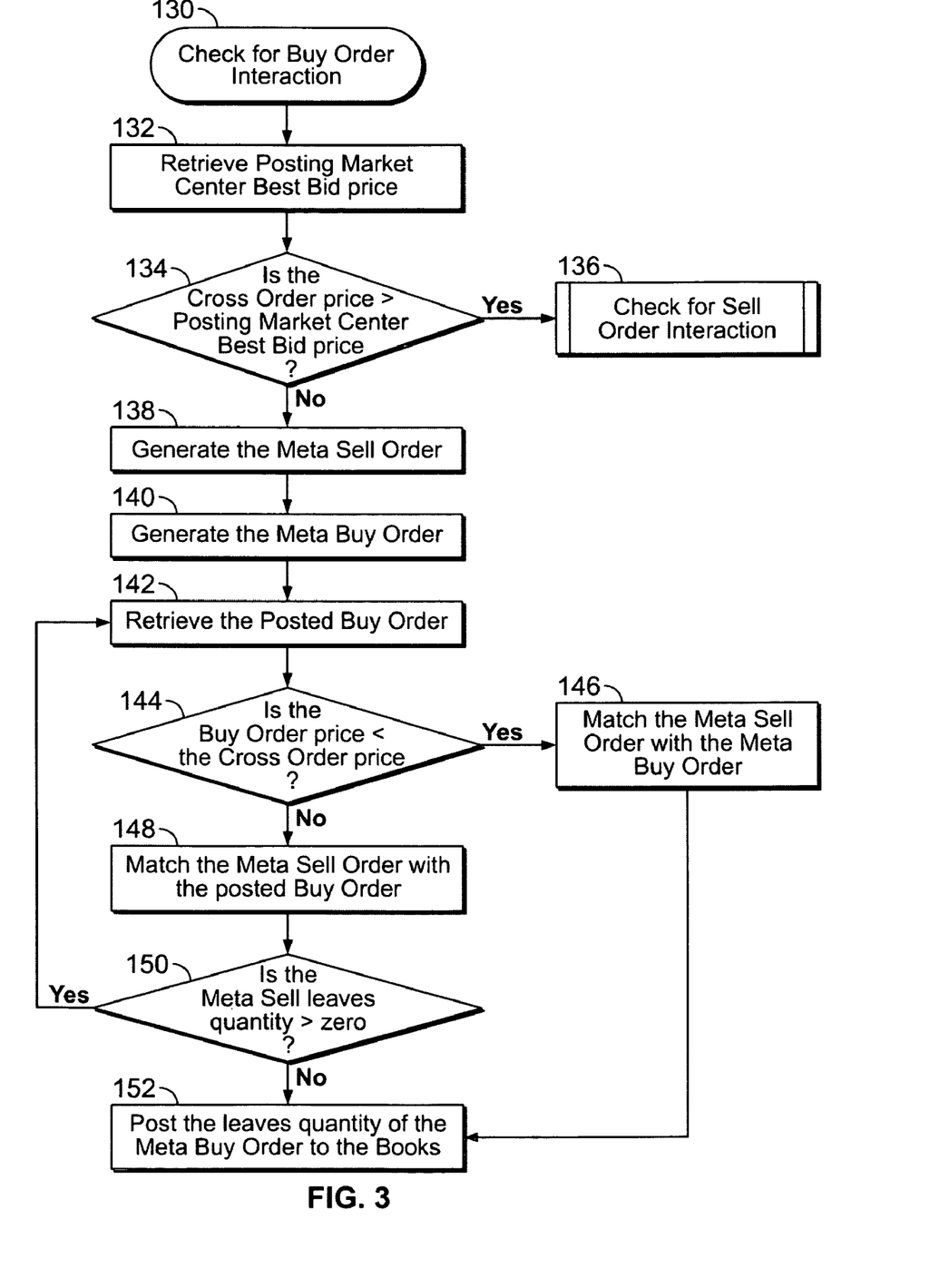
FIG. 3 is a flow diagram illustrating a process implemented by an embodiment of the present invention where a market center-restricted cross and post order is checked for buy order interaction with the posting market center order book.
Figure 4:
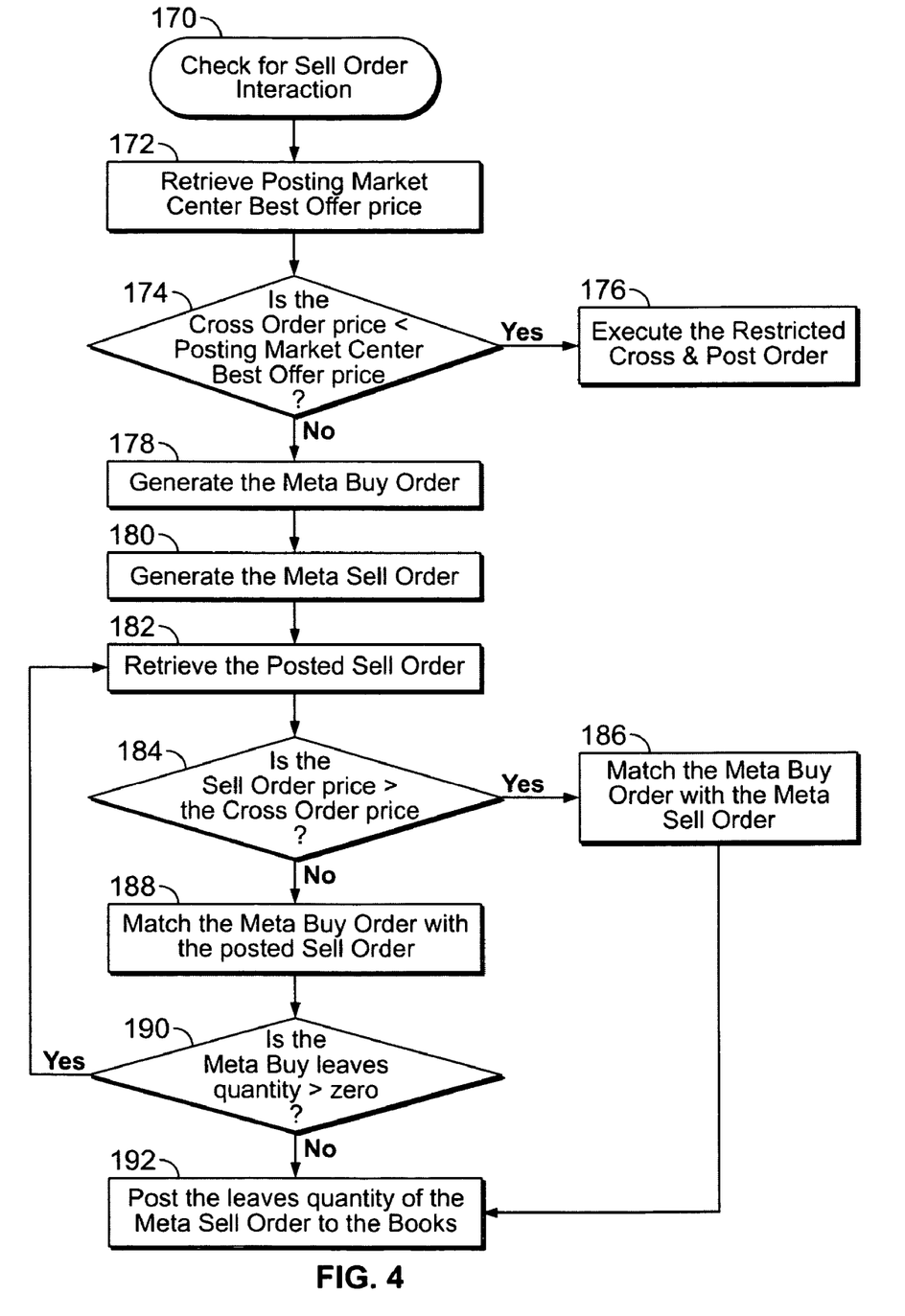
FIG. 4 is a flow diagram illustrating a process implemented by an embodiment of the present invention where a market center-restricted cross and post order is checked for sell order interaction with the posting market center order book.

FIGS. 2-4 illustrate the process implemented by the cross order implementation program 22 where a trader 26 sends a market center-restricted cross and post order to the posting market center 20 with instructions that the cross and post order only be executed on the posting market center 20 (i.e. a market center-restricted cross order). It should be understood that cross and post orders in other examples and embodiments of the present invention may instead be designated as unrestricted, where portions of the cross and post order could interact with or route to other market centers.

Cross and post orders need to comply with rules and regulations imposed by a posting market center and applicable regulatory bodies regarding the ability for such an order to trade at a price that is worse than a better priced away market center. These restrictions vary according to the issue being traded. While most issues do not allow any trade throughs, several issues allow trade throughs up to a maximum number of ticks worse than the market-wide best bid or offer. In the embodiment described herein, the process implemented by the cross order implementation program 22 first validates the received cross and post order against away market center prices before processing the cross and post order any further. In this embodiment, the order is validated first because market center-restricted orders cannot route to an away market center nor can they trade through their quotes. In other embodiments of the invention, where unrestricted cross and post orders are utilized, it should be understood that this validation step would not be necessary because such unrestricted cross and post orders would be accepted irrespective of prices on the away market centers. Also, it should be understood that in other embodiments of the present invention this validation may be conducted later in the process; for example, in a situation where the posting market center is at the market best bid or best offer, either alone or with an away market, and the cross and post order trades against these marketable orders first before checking the validity of the cross and post order in relation to away market prices.

Referring to FIG. 2, at step 100, a new market center-restricted cross and post order is received by the order matching engine 21, and the order matching engine 21, recognizing the cross and post order designation, initiates the cross order implementation program 22. At step 102, the process reads a maximum price exemption parameter (e.g. "MaxPriceExemption") from the order and trade parameters data structure 27. Depending on the applicable rules, a posting market center 20 is allowed to trade specified securities at prices that are worse than a better-priced market center up to a specified amount. This amount is the maximum price exemption parameter. The maximum price exemption parameter may be set differently for different securities. For example, the maximum price exemption may be set to 3¢ for one security and may be set to 5¢ for another security. The maximum price exemption parameter could also be set to zero, meaning that in practice no trade through is allowed. The posting market center 20 of the present invention is able to handle differing securities having differing maximum price exemptions. At step 104, the process retrieves the away market best offer price from the data structure 25. At step 106, the process computes the maximum price that the incoming cross and post order can be at to be a valid exempt order ("MaxValidCrossPrice"). The maximum price that a market center-restricted cross and post order can be at and still be valid is equal to the away market best offer price plus the maximum price exemption. For example, if the away market best offer price is $20 and the maximum price exemption is 3¢, then the maximum valid price for a market center-restricted cross and post order is $20.03. In this example, any market center-restricted cross and post order above $20.03 would be invalid and would be canceled. At step 108, the process retrieves the price of the market center-restricted cross and post order.

At step 110, the process determines whether the price of the market center-restricted cross and post order is greater than the computed maximum valid cross order price parameter. If the cross and post order price is greater than the maximum valid cross order price parameter, then the order is canceled, as indicated at step 118. If the cross and post order price is less than or equal to (i.e. not greater than) the maximum valid cross order price parameter, then the process continues to step 112 where the process retrieves the away market best bid price from the data structure 25. At step 114, the process computes the minimum price that the incoming cross and post order can be at to be a valid exempt order ("MinValidCrossPrice"). The minimum price that a market center-restricted cross and post order can be at and still be valid is equal to the away market best bid price minus the maximum price exemption. For example, if the away market best bid price is $19.95 and the maximum price exemption is 3¢, then the minimum valid price for a market center-restricted cross and post order is $19.92. In this example, any market center-restricted cross and post order below $19.92 would be invalid and would be canceled.

At step 116, the process determines whether the price of the market center-restricted cross and post order is less than the computed minimum valid cross order price parameter. If the cross and post order price is less than the minimum valid cross order price parameter, then the order is canceled, as indicated at step 118. If the cross and post order price is greater than or equal to (i.e. not less than) the minimum valid cross order price parameter, then the order proceeds to step 120 where the process then determines if the cross and post order interacts with any buy orders on the posting market center order book.

Referring to FIG. 3, the process, at step 130, determines whether the cross and post order has any interaction with the buy orders on the posting market center 20. At step 132, the process retrieves the best bid price on the posting market center 20. At step 134, the process checks whether the cross and post order price is greater than the retrieved best bid price on the posting market center 20. If the cross and post order price is greater than the posting market center best bid price, it means that the cross and post order does not interact with the bid side of the posting market center book. In that scenario, the process then continues on to step 136 to determine whether the cross and post order interacts with the offer side of the posting market center 20. Referring back to step 134, if the cross and post order price is less than the posting center best bid price, then the cross and post order does interact with the bid side of the posting market center order book. At steps 138 and 140, for the sell and buy components of the cross and post order, the process generates meta sell and meta buy orders to interact with the posting market center's order book for the respective components of the cross and post order. The meta sell order and meta buy order are generated to interact with and trade against the posting market center order book and act as surrogates for the buy and sell components of the cross and post order.

At step 142, the process retrieves the highest posted buy order on the posting market center book. At step 144, the process checks whether the retrieved posted buy order price is less than the cross and post order price. If the retrieved buy order price is not less than the cross and post order price (i.e. equal or greater to), then the process proceeds to step 148 where the process matches the meta sell order against the posted buy order up to the quantity that remains on the meta sell order or the quantity on the posted buy order. Once the meta sell order has been matched against the posted buy order, the process, at step 150, checks to determine if there is any quantity remaining on the generated meta sell order. If there is, the process returns to step 142 where the process retrieves the next buy order posted on the posting market center's order book and follows the same steps as discussed above. The process continues in this manner until there is no quantity remaining on the meta sell order or until there are no more buy orders posted on the posting market center that the meta sell order can trade against. As indicated by the arrow between steps 150 and 152, if the meta sell order has completely traded against the posting market center's order book, then the entire remaining meta buy order is converted to a standard, publicly displayed restricted buy order with a time stamp as of that moment. The resulting restricted buy order is posted to the order book, as above, according to price/time priority rules (i.e. a buy order at the highest price and first in time and a sell order at the lowest price and first in time have priority over all other orders in the same instrument and are ranked at the top of the order book).

Referring back to step 144, if the retrieved buy order price is less than the cross and post order price, then there is no interaction of the cross order with the buy orders posted on the posting market center book and the process proceeds to step 146. At step 146, any shares remaining on the meta sell order are matched with and executed against the meta buy order. At step 152, after the meta buy order executes against the meta sell order, the process converts the remaining shares of the meta buy order to a publicly displayed restricted buy order which is posted on the posting market center's order book according to price/time priority rules. Once the converted meta buy order is posted to the order book, it trades like any other market center-restricted limit order to buy on the order book. The only difference being that when the converted meta buy order finally executes, the execution is reported back to the broker that sent the cross and post order originally.

Referring back to step 134, if the cross and post order price is greater than the best bid price on the posting market center, then, as indicated at steps 136 and 170 (FIG. 4), the process checks for sell order interaction. Referring to FIG. 4, the process employs a methodology similar to the one that is employed in determining whether there is buy side interaction. At step 172, the process retrieves the best offer price on the posting market center 20. At step 174, the process determines whether the cross and post order price is less than the retrieved best offer price on the posting market center 20. If the cross and post order price is less than the posting market center's best offer price, it means that the cross order does not interact with the offer side of the posting market center order book either, and the cross order can execute cleanly against itself (i.e. a "clean cross"), as indicated at 176. Referring back to step 174, if the cross and post order price is greater than or equal to the posting market center's best offer price, then the cross and post order does interact with the offer side of the posting market center order book. At steps 178 and 180, similar to the process on the buy side, the process generates meta sell and meta buy orders for the sell and buy components of the cross and post order which interact with the posting market center's order book.

At step 182, the process retrieves the lowest posted sell order on the posting market center's order book. At step 184, the process checks whether the retrieved posted sell order price is greater than the cross and post order price. If the retrieved sell order price is not greater than the cross and post order price (i.e. equal to or less than), then the process proceeds to step 188 where the process matches the meta buy order against the posted sell order up to the quantity that remains on the meta buy order or the quantity on the posted sell order. Once the meta buy order has been matched against the posted sell order, the process, at step 190, checks to determine if there is any quantity remaining on the generated meta buy order. If there is, the process returns to step 182 where the process retrieves the next sell order posted on the posting market center's order book and follows the same steps as discussed above. The process continues in this manner until there is no quantity remaining on the meta buy order or until there are no more sell orders posted on the posting market center order book that the meta buy order can trade against. As indicated by the arrow between steps 190 and 192, if the meta buy order trades completely against the posting market center's order book, then there is nothing left to execute against the meta sell order and the entire meta sell order is converted to a standard, publicly displayed restricted sell order and given a time stamp as of that moment. The resulting restricted sell order is posted to the order book, as above, according to price/time priority rules.

Referring back to step 184, if the retrieved sell order price is greater than the cross and post order price, then the cross and post order does not interact with the sell orders posted on the posting market center's order book and the process proceeds to step 186. At step 186, any shares remaining on the meta buy order are matched with and executed against the meta sell order. At step 192, after the meta sell order executes against the meta buy order, the process converts the remaining shares of the meta sell order to a publicly displayed restricted sell order which is posted on the posting market center's order book according to price/time priority rules. Once the resulting restricted sell order is posted to the order book, it trades like any other market center-restricted limit order on the order book. The only difference being that when the converted meta sell order finally executes, the execution is reported back to the broker that sent the cross and post order originally.

Examples of restricted cross and post orders sent to a posting market center 20 are provided below. It should be understood that the order prices and market prices discussed in the examples below are by way of example only to illustrate how the process of an embodiment of the invention handles cross and post orders of the present invention.

Example 1

Incoming Market Center-Restricted Cross and Post Order with No Order Book Interaction ("Clean Cross")

In this Example 1, the Market Best Bid is $20 and the Market Best Offer is $20.05. The posting market center 20 is at the inside of the market by itself. The posting market center 20 is quoting 500@$20.00 to 900@$20.05. An Away Market Center A is quoting 300@$19.99 to 800@$20.08.

A 5¢ price exemption rule is in effect for the market discussed in this example for this security. It should also be understood that a 5¢ price exemption is shown by way of example only and that any amount of price exemption (e.g. 0, 3¢, 6¢, 10¢, 12¢, etc.) could be applied to the present invention without departing from the scope or spirit of the invention. The posting market center internal book in this example appears as follows ("Initial Order Book"):

|  | Bids |  | Offers |
|---|---|---|---|
| Order 1: | 500 @ 20.00 | Order 4: | 600 @ 20.05 |
| Order 2: | 700 @ 19.99 | Order 5: | 300 @ 20.05 |
| Away Market Center A: | 300 @ 19.99 | Order 6: | 200 @ 20.07 |
| Order 3: | 400 @ 19.97 | Away Market Center A: | 800 @ 20.08 |

The public Book looks like this:

|  | Bids |  | Offers |
|---|---|---|---|
| Posting Market Center | 500 @ 20.00 | Posting Market Center | 900 @ 20.05 |
| Posting Market Center | 700 @ 19.99 | Posting Market Center | 200 @ 20.07 |
| Posting Market Center | 400 @ 19.97 |  |  |

The posting market center 20 receives the following restricted cross and post order:
Order A: Restricted Cross and Post 8000@$20.03

Referring to FIG. 2, at step 102, the process reads the maximum price exemption parameter ("MaxPriceExemption"), which in this example is 5¢. Then at step 104, the process retrieves the away market best offer price from the data structure 25, which in this example is $20.08. At step 106, the process computes the maximum price that Order A can be at to be a valid exempt order ("MaxValidCrossPrice"). In this example, the maximum valid price for a cross and post order is $20.13 (i.e. the away market best offer price of $20.08 plus the maximum price exemption price parameter of 5¢). At step 108, the process retrieves the price of Order A, which in this case is $20.03.

At step 110, the process checks to see if the price of Order A ($20.03) is greater than the computed maximum valid cross order price parameter ($20.13). In this case, Order's A price is not greater; so, the process proceeds to check the cross and post order price against the opposite side of the market. At step 112, the process retrieves the away market best bid price from the data structure 25, which is $19.99 in this example. At step 114, the process computes the minimum price that Order A can be at to be a valid exempt order ("MinValidCrossPrice"). In this example, the minimum valid price for a cross and post order is $19.94 (i.e. the away market best bid price of $19.99 less the maximum price exemption of 5¢).

At step 116, the process checks to see if the price of Order A ($20.03) is less than the computed minimum valid cross order price parameter ($19.94). In this example, Order A's price is not less than the minimum valid cross order price parameter. So, the cross and post order is a valid order eligible for possible execution against the posting market center order book, and as indicated at 120, the process now determines whether the cross and post order needs to interact with the posting market center's order book.

In summary, in this example, any cross and post order priced between $19.94 to $20.13 is valid. Any cross and post order priced outside of that range, in this example, is invalid and is canceled by the process because as a restricted order it can neither route to an away market nor can it trade through the away market quote by more than the maximum price exemption. It should be kept in mind that in this example because the price exemption range is based on best away market prices, the best bid and offer prices on the posting market center's order book are irrelevant in determining cross and post order validity.

Referring to FIG. 3, the process, at step 132, retrieves the posting market center best bid price ($20.00). At step 134, the process checks if Order A's price ($20.03) is greater than the posting market center's best bid price ($20.00). In this case, the cross order price is greater, meaning the cross order does not interact with bid side of the posting market center order book. The process proceeds to step 136 where it determines whether the cross order interacts with the offer side of the posting market center order book.

Referring to FIG. 4, the process, at step 172, retrieves the posting market center best offer price ($20.05). At step 174, the process checks if Order A's price ($20.03) is less than the posting market center's best offer price ($20.05). In this case, Order A's price is less than the best offer price, meaning Order A does not interact with the offer side of the posting market center order book either. The process proceeds to step 176 where the buy and sell component of Order A are executed cleanly against one another, resulting in a "clean cross":
Order A execution: Crossed 8000@20.03

Because there was no interaction with the order book, the internal order book still looks as follows:

|  | Bids |  | Offers |
|---|---|---|---|
| Order 1: | 500 @ 20.00 | Order 4: | 600 @ 20.05 |
| Order 2: | 700 @ 19.99 | Order 5: | 300 @ 20.05 |
| Away Market Center A: | 300 @ 19.99 | Order 6: | 200 @ 20.07 |
| Order 3: | 400 @ 19.97 | Away Market Center A: | 800 @ 20.08 |

The public Book still looks like this:

|  | Bids |  | Offers |
|---|---|---|---|
| Posting Market Center | 500 @ 20.00 | Posting Market Center | 900 @ 20.05 |
| Posting Market Center | 700 @ 19.99 | Posting Market Center | 200 @ 20.07 |
| Posting Market Center | 400 @ 19.97 |  |  |

Example 2

Incoming Market Center-Restricted Cross and Post Order with Bid Side Order Book Interaction In Example 2, the posting market center's order book starts as the Initial Order Book. The posting market center 20 receives the following restricted cross and post order:
Order B: Restricted Cross and Post 8000@$19.99

As described above in Example 1 and illustrated in FIG. 2, the process first checks to determine whether the cross and post order is valid. In this example, the maximum price exemption parameter is still 5¢. Order B is a valid cross and post order. Order B is within the allowable minimum valid cross order price ($19.94) and the maximum valid cross order price ($20.13).

Since Order B is a valid cross and post order, the process determines whether Order B interacts with the posting market center's order book. At step 132, the process retrieves the posting market center best bid price of $20.00 in this example. At step 134, the process determines whether the Order B's price ($19.99) is greater than the posting market center's best bid price ($20.00). In this example, Order B's price is not greater than the posting market center's best bid price, meaning that Order B must interact with the bid side of the posting market center's order book.

The process continues to steps 138 and 140 where it automatically generates a meta sell order and a meta buy order, respectively. The meta sell order is generated to mirror the sell side of Order B (i.e. sell 8000@$19.99). The meta buy order is generated to mirror the buy side of Order B (i.e. buy 8000@$19.99).

After generating the meta orders, the process, at step 142, retrieves the best posted buy order from the posting market center order book, which is Order 1 in this example. It should be noted that even if the inside market was set by an away market center, such as Away Market Center A, the process would still retrieve Order 1 in this example and would retrieve any buy order posted on the posting market center's order book up to the maximum price exemption parameter.

At step 144, the process determines whether Order 1's price ($20.00) is less than Order B's price ($19.99). As Order 1's price ($20) is not less than Order B's ($19.99), the process at step 148 matches Order 1 (500 shares at $20) against the generated meta sell order.

Order 1 is completely executed. The posting market center's internal order book momentarily looks like this:

| Bids | | Offers | |
|---|---|---|---|
| Order 2: | 700 @ 19.99 | Order 4: | 600 @ 20.05 |
| Away Market Center A: | 300 @ 19.99 | Order 5: | 300 @ 20.05 |
| Order 3: | 400 @ 19.97 | Order 6: | 200 @ 20.07 |
| | | Away Market Center A: | 800 @ 20.08 |

After Order 1 is executed, the process continues on to step 150 where it determines whether the generated meta sell order has quantity remaining (i.e. has quantity greater than zero). In this example, the meta sell order has 7500 shares remaining after the execution of Order 1 (8000−500=7500). The process, therefore, returns to step 142 where it retrieves Order 2, the next buy order posted on the posting market center's order book.

At step 144, the process, as before, determines whether Order 2's price ($19.99) is less than Order B's price ($19.99). In this case, Order B's price ($19.99) is not less than Order 2's price ($19.99). They are equal. As such, the process continues on to step 148 where it matches Order 2 (700 shares at $19.99) against the meta sell order.

Order 2 is completely executed. The internal order book momentarily looks like this:

| Bids | | Offers | |
|---|---|---|---|
| Away Market Center A: | 300 @ 19.99 | Order 4: | 600 @ 20.05 |
| Order 3: | 400 @ 19.97 | Order 5: | 300 @ 20.05 |
| | | Order 6: | 200 @ 20.07 |
| | | Away Market Center A: | 800 @ 20.08 |

At step 150, the process once again determines whether the generated meta sell order has quantity remaining. In this example, the meta sell order still has 6800 shares remaining after the execution of Order 2 (7500−700=6800). The process, therefore, returns to step 142 where it retrieves Order 3, the next buy order posted on the posting market center's order book. Order 3 is retrieved even though it has a worse price ($19.97) than Away Market Center A's quote ($19.99) because of the 50¢ price exemption in effect in this example.

At step 144, the process, as before, again determines whether Order 3's price ($19.97) is less than Order B's price ($19.99). In this case, Order B's price ($19.99) is greater than Order 3's price ($19.97), meaning Order B does not interact with Order 3. The process, at this point, proceeds to step 146 where it crosses the 6800 remaining shares of the meta sell order with 6800 shares of the meta buy order in a single execution:

Order B: Crossed 6800@19.99

After the execution of the cross, the meta buy order still has 1200 shares available to trade (original order size of 8000 less 6800 shares crossed=1200 shares not yet executed).

At step 152, the process converts the remaining shares of the internal meta buy order to a standard restricted limit order to buy 1200 at $19.99. The process assigns a current timestamp to the newly generated restricted buy order and posts it to the order book in price/time priority with respect to the other orders on the book.

The internal order book at this point looks like this:

| Bids | | Offers | |
|---|---|---|---|
| Restricted Order B: | 1200 @ $19.99 ← | Order 4: | 600 @ 20.05 |
| Away Market Center A: | 300 @ $19.99 | Order 5: | 300 @ 20.05 |
| Order 3: | 400 @ 19.97 | Order 6: | 200 @ 20.07 |
| | | Away Market Center A: | 800 @ 20.08 |

The process also posts the generated restricted buy order to the public book, where it looks like any other posted limit order and is included in the top of book quote. The posting market center's best bid and offer at this point is 1200 at $19.99 to 900 at $20.05. The public book looks like this:

| Bids | | Offers | |
|---|---|---|---|
| Posting Market Center | 1200 @ 19.99 ← | Posting Market Center | 900 @ 20.05 |
| Posting Market Center | 400 @ 19.97 | Posting Market Center | 200 @ 20.07 |

Once posted to the book, the restricted buy order generated from the remaining meta portion of Order B trades like a regular restricted limit order. This means it trades with incoming sell orders, but is not routed to away markets. By way of example, the posting market center 20 receives the following incoming order:

Order 7: Sell 1000@19.99

The process matches 1000 shares of Order 7 with 1000 shares of Restricted Order B:

Order 7: Sold 1000@19.99

Restricted Order B: Bought 1000@19.99 (Leaves quantity=200 shares)

Restricted Order B still has 200 shares remaining. The internal order book looks like this:

| Bids | | Offers | |
|---|---|---|---|
| Restricted Order B: | 200 @ 19.99 ← | Order 4: | 600 @ 20.05 |
| Away Market Center A: | 300 @ 19.99 | Order 5: | 300 @ 20.05 |
| Order 3: | 400 @ 19.97 | Order 6: | 200 @ 20.07 |
| | | Away Market Center A: | 800 @ 20.08 |

The posting market center's best bid and offer is now 200 at $19.99 to 900 at $20.05. The public order book looks like this:

| Bids | | Offers | |
|---|---|---|---|
| Posting Market Center | 200 @ 19.99 ← | Posting Market Center | 900 @ 20.05 |
| Posting Market Center | 400 @ 19.97 | Posting Market Center | 200 @ 20.07 |

The posting market center 20 then receives the following incoming order:

Order 8: Sell 200@19.99

The posting market center 20 proceeds to match the 200 shares of Order 8 with the remaining 200 shares of Restricted Order B, resulting in:

Order 8: Sold 200@19.99

Restricted Order B: Bought 200@19.99 (Leaves quantity=0 shares)

Restricted Order B is completely executed. The internal order book looks like this:

| Bids | | Offers | |
|---|---|---|---|
| Away Market Center A: | 300 @ 19.99 | Order 4: | 600 @ 20.05 |
| Order 3: | 400 @ 19.97 | Order 5: | 300 @ 20.05 |
| | | Order 6: | 200 @ 20.07 |
| | | Away Market Center A: | 800 @ 20.08 |

The posting market center's best bid and offer is now 400 at $19.97 to 900 at $20.05. The public Book looks like this:

| Bids | | Offers | |
|---|---|---|---|
| Posting Market Center | 400 @ 19.97 ← | Posting Market Center | 900 @ 20.05 |
| | | Posting Market Center | 200 @ 20.07 |

The posting market center 20 reports the executions for the restricted cross and post order, Order B, and the meta order trading information to the client:

Order B Execution 1: Sold 500@20.00 (matched posted Buy Order 1)

Order B Execution 2: Sold 700@19.99 (matched posted Buy Order 2)

Order B Execution 3: Crossed 6800@19.99 (crossed cleanly)

Order B Execution 4: Bought 1000@19.99 (matched incoming Sell Order 7)

Order B Execution 5: Bought 200@19.99 (matched incoming Sell Order 8)

A total of 8000 shares were sold:

Execution 1: Sold 500@20.00 (matched posted Buy Order 1)

Execution 2: Sold 700@19.99 (matched posted Buy Order 2)

Execution 3: Sold 6800@19.99 (crossed cleanly)

A total of 8000 shares were bought:

Execution 3: Bought 6800@19.99 (crossed cleanly)

Execution 4: Bought 1000@19.99 (matched incoming Sell Order 7)

Execution 5: Bought 200@19.99 (matched incoming Sell Order 8)

Restricted cross and post Order B is completely filled.

Example 3

Incoming Market Center-Restricted Cross Order with Offer Side Order Book Interaction In Example 3, the posting market center's order book starts as the Initial Order Book. The posting market center 20 receives the following restricted cross and post order:

Order C: Restricted Cross and Post 10,000@$20.06

As described above in Examples 1 and 2 and illustrated in FIG. 2, the process first checks to determine whether the cross and post order is valid. In this example, the maximum price exemption parameter is again 5¢. Order C is a valid cross and post order. Order C is within the allowable minimum valid cross order price ($19.94) and the maximum valid cross order price ($20.13).

Since Order C is a valid cross and post order, the process determines whether Order C interacts with the posting market center's order book. At step 132, the process retrieves the posting market center best bid price of $20.00 in this example. At step 134, the process determines whether the Order C's price ($20.06) is greater than the posting market center's best bid price ($20.00). In this example, Order C's price is greater than the posting market center's best bid price, meaning that Order C does not interact with the bid side of the posting market center's order book and proceeds to step 136 where the process determines whether Order C interacts with the offer side of the posting market center order book.

At step 172, the process retrieves the posting market center best offer price, which is $20.05 in this example. At step 174, the process determines whether Order C's price ($20.06) is less than the posting market center's best offer price ($20.05). In this example, Order C's price is not less than the posting market center's best offer price, meaning that Order C must interact with the offer side of the posting market center's order book.

The process continues to steps 178 and 180 where it automatically generates a meta buy order and a meta sell order. The meta buy order is generated to mirror the buy side of Order C (i.e. buy 10,000@$20.06). The meta sell order is generated to mirror the sell side of Order C (i.e. sell 10,000@$20.06).

After generating the meta orders, the process, at step 182, retrieves the best posted sell order from the posting market center order book, which is Order 4 in this example. As in example 2, it should be noted that even if the inside market was set by an away market center, such as Away Market Center A, the process would still retrieve Order 4 in this example and would retrieve any posted sell order up to the maximum price exemption parameter.

At step 184, the process determines whether Order 4's price ($20.05) is greater than Order C's price ($20.06). As Order 4's price ($20.05) is not greater than Order C's ($20.06), the process at step 188 matches Order 4 (600 shares at $20.05) against the meta buy order. Order 4 experiences price improvement (i.e. trades at $20.06 instead of $20.05) because Order C is a block transaction and all shares need to execute at the same price.

Order 4 is completely executed. The posting market center's internal order book momentarily looks like this:

| Bids | | Offers | |
|---|---|---|---|
| Order 1: | 500 @ 20.00 | Order 5: | 300 @ 20.05 |
| Order 2: | 700 @ 19.99 | Order 6: | 200 @ 20.07 |
| Away Market Center A: | 300 @ 19.99 | Away Market Center A: | 800 @ 20.08 |
| Order 3: | 400 @ 19.97 | | |

After Order 4 is executed, the process continues on to step 190 where it determines whether the generated meta buy order has quantity remaining (i.e. has quantity greater than zero). In this example, the meta buy order has 9400 shares remaining after the execution of Order 4 (10,000−600=9400). The process, therefore, returns to step 182 where it retrieves Order 5, the next sell order posted on the posting market center's order book.

At step 184, the process, as before, determines whether Order 5's price ($20.05) is greater than Order C's price ($20.06). In this case, Order 5's price ($20.05) is not greater than Order C's price ($20.06). As such, the process continues on to step 188 where it matches Order 5 (300 shares at $20.05) against the meta buy order. Order 5 also experiences price improvement (i.e. trades at $20.06 instead of $20.05), again, because Order C is a block transaction.

Order 5 is completely executed. The internal order book momentarily looks like this:

| Bids | | Offers | |
|---|---|---|---|
| Order 1: | 500 @ 20.00 | Order 6: | 200 @ 20.07 |
| Order 2: | 700 @ 19.99 | Away Market Center A: | 800 @ 20.08 |
| Away Market Center A: | 300 @ 19.99 | | |
| Order 3: | 400 @ 19.97 | | |

At step 190, the process once again determines whether the generated meta buy order has quantity remaining. In this example, the meta buy order still has 9100 shares remaining after the execution of Order 5 (9400−300=9100). The process, therefore, returns to step 182 where it retrieves Order 6, the next buy order posted on the posting market center's order book.

At step 184, the process, as before, again determines whether Order 6's price ($20.07) is greater than Order C's price ($20.06). In this case, Order 6's price ($20.07) is greater than Order C's price ($20.06), meaning Order C does not interact with Order 6. The process, at this point, proceeds to step 186 where it crosses the 9100 remaining shares of the meta buy order with 9100 shares of the meta sell order in a single execution:

Order C: Crossed 9100@20.06

After the execution of the cross, the meta sell order still has 900 shares available to trade (original order size of 10,000 less 9100 shares crossed=900 shares not yet executed).

At step 192, the process converts the remaining shares of the internal meta sell order to a standard restricted limit order to sell 900 at $20.06. The process assigns a current timestamp to the newly generated restricted sell order and posts it to the order book in price/time priority with respect to the other orders on the book.

The internal order book at this point looks like this:

| Bids | | Offers | |
|---|---|---|---|
| Order 1: | 500 @ 20.00 | Restricted Order C: | 900 @ 20.06 ← |
| Order 2: | 700 @ 19.99 | Order 6: | 200 @ 20.07 |
| Away Market Center A: | 300 @ 19.99 | Away Market Center A: | 800 @ 20.08 |
| Order 3: | 400 @ 19.97 | | |

The process also posts the generated restricted sell order to the public book, where it looks like any other posted limit order and is included in the top of book quote. The posting market center's best bid and offer at this point is 500@$20.00 to 900@$20.06. The public book looks like this:

| Bids | | Offers | |
|---|---|---|---|
| Posting Market Center | 500 @ 20.00 | Posting Market Center | 900 @ 20.06 ← |
| Posting Market Center | 700 @ 19.99 | Posting Market Center | 200 @ 20.07 |
| Posting Market Center | 400 @ 19.97 | | |

Once posted to the book, the restricted sell order generated from the remaining meta portion of Order C trades like a regular restricted limit order. This means it trades with incoming buy orders, but is not routed to away markets. By way of example, the posting market center 20 receives the following incoming order:

Order 9: Buy 900@Market

The posting market center 20 matches 900 shares of Order 9 with 900 shares of Restricted Order C, filling both orders completely:

Order 9: Bought 900@20.06
Restricted Order C: Sold 900@20.06 (Leaves quantity=0 shares)

The internal order book looks like this:

| Bids | | Offers | |
|---|---|---|---|
| Order 1: | 500 @ 20.00 | Order 6: | 200 @ 20.07 |
| Order 2: | 700 @ 19.99 | Away Market Center A: | 800 @ 20.08 |
| Away Market Center A: | 300 @ 19.99 | | |
| Order 3: | 400 @ 19.97 | | |

The posting market center's best bid and offer is now 500 at $20.00 to 200 at $20.07. The public book looks like this:

| Bids | | Offers | |
|---|---|---|---|
| Posting Market Center | 500 @ 20.00 | Posting Market Center | 200 @ 20.07 ← |
| Posting Market Center | 700 @ 19.99 | | |
| Posting Market Center | 400 @ 19.97 | | |

The posting market center 20 reports the executions for the restricted cross and post order, Order C, and the meta order trading information to the client:

Order C Execution 1: Bought 600@20.06 (matched posted Sell Order 4)

Order C Execution 2: Bought 300@20.06 (matched posted Sell Order 5)

Order C Execution 3: Crossed 9100@20.06 (crossed cleanly)

Order C Execution 4: Sold 900@20.06 (matched incoming Buy Order 9)

A total of 10,000 shares have been bought:

Execution 1: Bought 600@20.06 (matched posted Sell Order 4)

Execution 2: Bought 300@20.06 (matched posted Sell Order 5)

Execution 3: Bought 9100@20.06 (crossed cleanly)

A total of 10,000 shares have been sold:

Execution 3: Sold 9100@20.06 (crossed cleanly)

Execution 4: Sold 900@20.06 (matched incoming Buy Order 9)

Restricted Cross and Post Order C is completely filled.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method implemented at least partially in a programmed computer for processing a cross order, the method comprising:

providing a posting market center having an internal order book;

receiving by the programmed computer, a cross order, wherein the cross order identifies a buy order component with a number of shares to buy and a sell order component with a number of shares to sell, the respective number of shares to buy in the buy order component and number of shares to sell in the sell order component being equal and forming the cross order;

matching by the programmed computer, at least a portion of the cross order against the internal order book, resulting in a remainder of the cross order;

matching by the programmed computer, the remainder of the cross order against the opposite component of itself, resulting in an unexecuted portion of the opposite component of the cross order;

converting by the programmed computer, the unexecuted portion of the opposite component of the cross order into a limit-priced order; and posting by the programmed computer, the limit-priced order generated from the conversion to the internal order book.

2. The method of claim 1, further comprising:

matching by the programmed computer, the generated limit-priced order against a contra-side order, resulting in a trade; and associating by the programmed computer, the trade of the limit-priced order with the cross order.

3. The method of claim 1, wherein the cross order is a market-center restricted order.

4. The method of claim 1, wherein the cross order is not restricted to a specific market-center.

5. The method of claim 1, wherein after receiving the cross order, further comprising validating by the programmed computer, the cross order as a valid order.

6. The method of claim 1, wherein after receiving the cross order, further comprising generating by the programmed computer, a meta sell order and a meta buy order to represent the cross order.

7. A method implemented at least partially in a programmed computer for processing a cross order, the method comprising:

providing a posting market center having an order book with at least one buy order on the order book having a best bid price for the posting market center;

receiving by the programmed computer, a cross order with a cross order price and an offsetting buy order component and sell order component, wherein the number of shares in the buy order component and the number of shares in the sell order component are equal;

determining by the programmed computer, whether the cross order price is higher than the best bid price, wherein when the cross order price is not higher than the best bid price, generating a meta sell order to represent the sell order component of the cross order and generating a meta buy order to represent the buy order component of the cross order;

matching by the programmed computer, the generated meta sell order with the buy order on the order book having the best bid price, resulting in the meta sell order having a portion remaining;

executing by the programmed computer, the remaining portion of the meta sell order against the generated meta buy order, resulting in a portion of the meta buy order being unexecuted;

converting by the programmed computer, the unexecuted portion of the meta buy order into a limit-priced buy order; and posting by the programmed computer, the limit-priced buy order generated from the conversion to the order book.

8. The method of claim 7, further comprising:

matching by the programmed computer, the generated limit-priced buy order against a sell order, resulting in a trade; and associating by the programmed computer, the trade of the limit-priced buy order with the cross order.

9. The method of claim 7, wherein the cross order is a market-center restricted order.

10. The method of claim 7, wherein the cross order is not restricted to a specific market-center.

11. The method of claim 7, wherein after receiving the cross order, further comprising validating by the programmed computer, the cross order as a valid order.

12. A method implemented at least partially in a programmed computer for processing a cross order, the method comprising:

providing a posting market center having an order book with at least one sell order on the order book having a best offer price for the posting market center;

receiving by the programmed computer, a cross order with a cross order price and an offsetting buy order component and sell order component, wherein the number of shares in the buy order component and the number of shares in the sell order component are equal;

determining by the programmed computer, whether the cross order price is lower than the best offer price, wherein when the cross order price is not lower than the best offer price, generating a meta sell order to represent the sell order component of the cross order and generating a meta buy order to represent the buy order component of the cross order;

matching by the programmed computer, the generated meta buy order with the sell order on the order book having the best offer price, resulting in the meta buy order having a portion remaining;

executing by the programmed computer, the remaining portion of the meta buy order against the generated meta sell order, resulting in a portion of the meta sell order being unexecuted;

converting by the programmed computer, the unexecuted portion of the meta sell order into a limit-priced sell order; and posting by the programmed computer, the limit-priced sell order generated from the conversion to the order book.

13. The method of claim 12, further comprising:

matching by the programmed computer, the generated limit-priced sell order against a buy order, resulting in a trade; and associating by the programmed computer, the trade of the limit-priced sell order with the cross order.

14. The method of claim 12, wherein the cross order is a market-center restricted order.

15. The method of claim 12, wherein the cross order is not restricted to a specific market-center.

16. The method of claim 12, wherein after receiving the cross order, further comprising validating by the programmed computer, the cross order as a valid order.

17. A posting market center, comprising:

an internal order book;

an interface for automatically receiving orders, including a cross order, wherein the cross order identifies a buy order component with a number of shares to buy and a sell order component with a number of shares to sell, the respective number of shares to buy in the buy order component and the number of shares to sell in the sell order component being equal and forming the cross order;

a posting market center memory for storing code for analyzing and processing cross orders;

a processor for interacting with the interface and executing the code for analyzing and processing cross orders stored in the memory when the interface receives a cross order, wherein the code, when executed:

call determines whether the cross order interacts with an order on the internal order book;

wherein when the executed code determines that the cross order interacts with an order on the internal order book, the code automatically matches at least a portion of the cross order against an order on the internal order book, resulting in a remainder of the cross order;

the executed code automatically matches the remainder of the cross order against the opposite component of itself, resulting in an unexecuted portion of the opposite component of the cross order;

the executed code automatically converts the unexecuted portion of the opposite component of the cross order into a limit-priced order; and automatically posts the limit-priced order generated from the conversion to the internal order book.

* * * * *